Feb. 24, 1942.  E. M. HOOVER  2,274,448
MOTOR DRIVEN HAND TOOL
Filed June 24, 1940
Fig. 1.
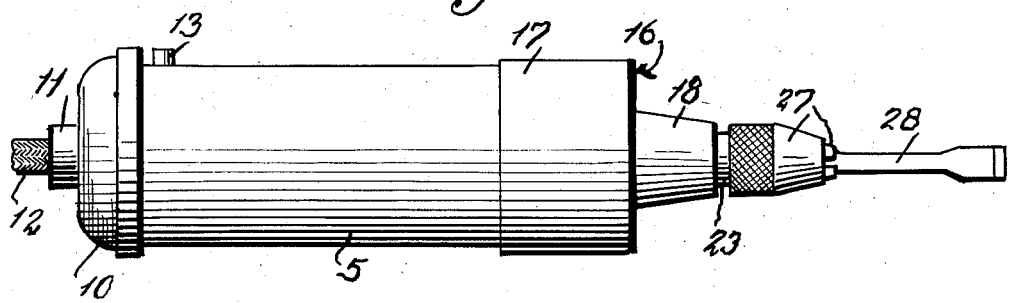
Fig. 2.
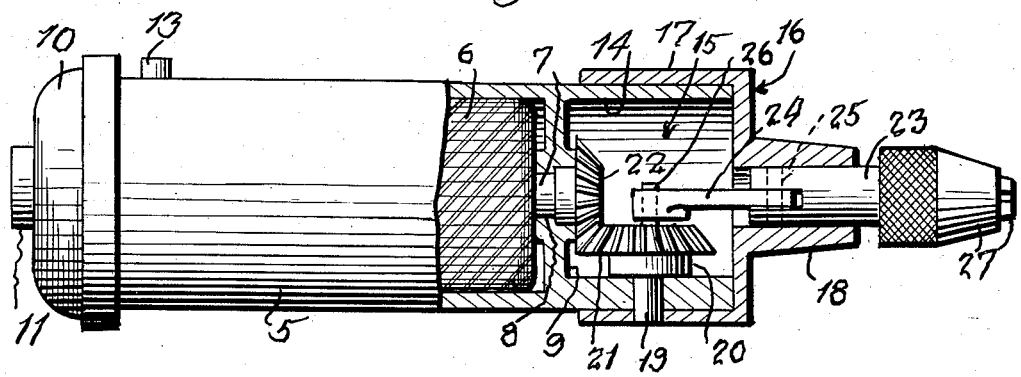
Fig. 3.
Inventor
Edward M. Hoover.
By
Attorney.

Patented Feb. 24, 1942

2,274,448

UNITED STATES PATENT OFFICE 2,274,448

MOTOR DRIVEN HAND TOOL

Edward M. Hoover, Anderson, Ind., assignor to H and H Research Company, Detroit, Mich., a corporation of Michigan Application June 24, 1940, Serial No. 342,171

1 Claim. (Cl. 74—44)

This invention relates to certain new and useful improvements in motor driven hand tools.

The primary object of the invention is to provide a motor driven hand tool and while designed for various uses, is especially adaptable for use by die makers and engravers for the finishing of dies and the like.

A further object of the invention is to provide a motor driven hand tool of the foregoing character wherein the rotary motion driven shaft is converted into reciprocatory movement so that the tool may be used for filing, chipping, routing, cutting and the like.

With the above and other objects in view that will become apparent as the nature of the invention is better understood, the same consists in the novel form, combination and arrangement of parts hereinafter more fully described, shown in the accompanying drawing and claimed.

In the drawing—

Figure 1 is a side elevational view of a motor driven hand tool constructed in accordance with the present invention;

Figure 2 is a side elevational view, partly broken away and shown in section to illustrate the electric motor and the bevel gear drive between the motor and a tool chuck for converting rotary motion to rectilinear motion; and Figure 3 is a side elevational view, partly broken away and shown in section with the bevel gear drive illustrated at right angles to the position shown in Figure 2.

Referring more in detail to the accompanying drawing, the motor driven hand tool comprises a motor casing 5 preferably of cylindrical formation to form a hand grip, the casing 5 housing a motor 6 that has a shaft 7 journalled in a bearing 8 in the cross-wall 9 adjacent one end of the casing 5. The other end of the casing carries a removable cap 10 permitting access to the motor 6 and which cap carries a tubular boss 11 projecting outwardly therefrom and through which boss and cap a flexible electric conductor 12 extends. The motor 6 is controlled in its operation by the switch button 13 projecting through a side wall of the casing 5.

As shown in Figures 2 and 3, the cylindrical wall of the casing 5 carries a cylindrical extension 14 beyond the end wall 9 to provide a chamber 15 forwardly of the wall 9 that is closed at its outer end by a removable cap having an end wall 16 and an annular side wall 17 telescopically mounted upon the extension wall 14. A tubular bearing 18 projects outwardly of the end wall 16 of the cap in axial alignment with the bearing 8 in the wall 9 and the motor shaft 7.

A stub shaft 19 is disposed radially of the chamber 15 and is mounted in the extension wall 14 of the motor casing 5 and the side wall 17 of the cap for securing the cap in position on the motor case extension, the inner end of the shaft 19 having a disk 20 mounted thereon to provide a support for a bevel gear 21 journalled upon the inner terminal end of the shaft 19. The bevel gear 21 is disposed for meshing engagement with a bevel pinion 22 secured to the end of the motor shaft 7 that projects into the chamber 15. A stub shaft 23 is reciprocably mounted in the tubular bearing 18 projecting outwardly from the end wall of the cap 16 and a pitman rod 24 has one end thereof pivotally attached as at 25 to the inner end of the stub shaft 23 while the other end of the pitman rod 24 has a pivotal eccentric mounting 26 with a side face of the bevel gear 21. A chuck arrangement designated in general by the reference character 27 is carried by the outer end of the stub shaft 23 for the reception and support of a tool 28 of a preferred character. In assembling the tool parts, the cap 16 receives the stub shaft 23, pitman 24, bevel gear 21 and gear supporting disk 20. The cap is then placed on the extension wall 14 of the motor casing 5 and the stub shaft 19 is then inserted in the registering openings in the extension wall 14 and side wall 17 of the cap for positioning engagement with the supporting disk 20 and gear 21 and further acts to retain the cap 16 upon the motor body.

Tools for accomplishing such operations as filing, chipping, routing, cutting and the like may be mounted in the chuck arrangement 27 and reciprocated during operation by the meshing gear and pitman rod connections between the motor shaft 7 and the reciprocating stub shaft 23.

From the above detailed description of the invention, it is believed that the construction and operation thereof will at once be apparent and while there is herein shown and described the preferred embodiment of the invention, it is nvertheless to be understood that minor changes may be made therein without departing from the spirit and scope of the invention as claimed.

I claim:

In a motor driven hand tool, wherein a casing has a partition wall therein adjacent one end defining a motor chamber and a mechanism chamber, wherein a closure cap for the outer end of the chamber has an end wall with a tubular bearing projecting outwardly thereof and a side wall inclosing the wall of the mechanism chamber, wherein a motor and shaft are disposed in the motor chamber, wherein the partition wall has a bearing therein for the motor shaft with the latter projecting into the mechanism chamber, wherein a bevel pinion is fixed on the projecting end of the motor shaft, wherein a stub shaft is reciprocably mounted in the tubular bearing carried by the cap, wherein a bevel gear in the mechanism chamber meshes with said pinion, wherein a pitman rod connects the bevel gear and stub shaft and wherein a chuck arrangement is carried by the outer end of said stub shaft, a stub shaft supporting the bevel gear extending radially through the side wall of the cap and the wall of the mechanism chamber and operative for holding the cap on said chamber.

EDWARD M. HOOVER.